3,833,717
PRODUCTION OF CUPROUS OXIDE
Philip R. Haskett, Donald J. Bauer, Roald E. Lindstrom, and Carl H. Elges III, Reno, Nev., assignors to the United States of America as represented by the Secretary of the Interior
No Drawing. Filed Aug. 1, 1972, Ser. No. 277,016
Int. Cl. C01g 3/02, 5/00, 7/00
U.S. Cl. 423—604                                    1 Claim

ABSTRACT OF THE DISCLOSURE

Cupric ammine complex is reduced to cuprous ammine complex in aqueous solution by means of conventional reducing agents such as $H_2$ or CO. The cuprous complex is then treated with a base, such as NaOH, to precipitate cuprous oxide.

---

Cuprous oxide, $Cu_2O$, is finding increasing use in a number of commercial applications such as hydrometallurgy, paints, catalysts, reducing agents, etc. Improved techniques for its production, especially from aqueous leach and waste solutions, is therefore of increasing importance.

Prior art processes for production of $Cu_2O$ include (1) heating a mixture of cupric oxide and copper to about 1030° C. and cooling in an inert atmosphere, (2) blowing air through molten copper and removing the $Cu_2O$ that forms on the surface, and (3) electrolysis using copper electrodes. All of these methods are, however, high cost operations, and they do not provide a direct method for recovery of $Cu_2O$ from aqueous copper solutions.

It has now been found, according to the process of the invention, that $Cu_2O$ can be conveniently and economically recovered from aqueous copper (II), i.e. cupric, solutions by means of a process comprising (1) formation of an ammine complex with the copper (II) ions in solution, (2) reducing the copper (II) ammine complex to copper (I), i.e. cuprous, ammine complex by treatment of the solution with a reducing agent under basic conditions and (3) precipitation of $Cu_2O$ by addition of further base.

Aqueous copper feed solutions for treatment according to the process of the invention may be obtained from a variety of sources, including ore solution obtained by treatment of ores with ammonia leaching solutions, solutions from the dissolution of scrap copper or native copper in ammonium carbonate-ammonia leachants, and solutions prepared for the purpose as, for example, by the addition of $NH_3$ or $NH_4OH$ to a solution of $CuSO_4$. Such solutions will generally contain copper in amounts of about 1.0 to 150 g./l. Minor amounts, e.g. about 0.1 g./l., of other metals, such as zinc, nickel or cobalt, may also be present without interfering with production of the $Cu_2O$. The solutions may also contain one or more of a variety of anions, such as sulfate, carbonate, or chloride.

The pH of the feed solution is not critical and may range from about 0 to 12.0. Ammonia is added, either as ammonium hydroxide or as gaseous ammonia, in an amount sufficient to form the cupric ammine complex. This will usually result in a solution pH of about 9 to 11. The complex may contain one, two, three or four ammonia groups per copper (II) ion, depending on such factors as concentration of the copper and the ammonia in the aqueous solution, other metals present, types of anions, etc., and, accordingly, the amount of ammonia required may vary considerably. Since, however, the essential function of the complex is to maintain the copper in solution as it is reduced under basic conditions, the ammonia is simply added in an amount sufficient to achieve this purpose. Generally, the preferred amount of ammonia is about 2 to 4 moles (based on $NH_4OH$) per mole of copper. Ambient conditions of temperature and pressure are generally satisfactory for formation of the complex.

As stated above, the function of the complex is to maintain the copper in solution as it is reduced. The amine copper complex is unique for this purpose for two reasons: (1) ligand released from the complex during the reducing process becomes a conjugate acid of a strong base, which enters into the reduction reaction as well as the subsequent precipitation reaction and (2) the ammine copper (I) complex has a higher stability constant than the ammine copper (II) complex so that the diammine copper (I) complex is a stable species in solution.

Reduction of the copper (II) ammine complex to copper (I) ammine complex is accomplished by treatment of the solution with any of a variety of conventional reducing agents such as hydrogen, carbon monoxide, sodium hydrosulfite, formaldehyde, sodium sulfoxylate formaldehyde, etc. Gaseous reducing agents such as hydrogen or carbon monoxide are preferred. The amount of reducing agent will usually be the stoichiometric amount required to completely reduce the copper (II) complex to copper (I) complex, although an excess of reducing agent may, in some cases, provide faster or more efficient reduction. Again, ambient temperature and pressure are usually satisfactory, although temperatures as high as about 180° C. and pressures as high as about 200 p.s.i.g. may be used and will generally provide some increase in the efficiency of the reduction reaction. It is usually best to avoid temperatures above 180° C. since formation of appreciable amounts of metallic copper may result at higher temperature. Reduction time is dependent on temperature and pressure, as well as on the specific reducing agent employed, but about 30 to 35 minutes is usually sufficient.

Precipitation of $Cu_2O$ from the solution of copper (I) ammine complex is accomplished by addition of further base such as sodium hydroxide or potassium hydroxide. Simultaneously, ammonia is liberated for recycling to the initial ammine complex-forming step in the process. The amount of additional base employed is not critical, provided it is at least equal to the stoichiometric amount required to precipitate the $Cu_2O$. Preferably, the base is employed in an amount of about 10 percent in excess of the stoichiometric amount, i.e., in excess of the amount required to react with the total complexed ammonia. Again, ambient conditions of temperature and pressure are generally satisfactory.

Recovery of the precipitated $Cu_2O$ may be by any conventional means such as filtration or centrifugal separation.

The invention will be more specifically illustrated by the following example.

EXAMPLE

A solution containing 16.25 grams of copper, essentially in $Cu^{+2}$ form, and 6.8 grams of $NH_3$ was placed in an autoclave at 200 p.s.i.g. of CO pressure and allowed to react at 120° C. for 30 minutes. The pressure was reduced after cooling to 90° C., after which 100 ml. of a 25 percent solution (w./v.) of NaOH was added to the resulting diammine copper (I) complex solution to precipitate $Cu_2O$. The autoclave was reheated under atmospheric pressure, and >95 percent of the $NH_3$ was expelled. The solution was filtered, and the precipitate was washed and vacuum dried. The yellow product $Cu_2O$ represented near quantitative recovery of copper from the feed solution.

We claim:

1. A method for production of yellow cuprous oxide from an aqueous solution of cupric ions comprising (1) addition of ammonia in an amount sufficient to form an ammine complex with the cupric ions in solution, (2) treatment of the solution with hydrogen or carbon monoxide in an amount sufficient to substantially completely reduce the cupric ammine complex to cuprous ammine complex, said treatment being under basic conditions and at a temperature and pressure not exceeding about 180° C. and 200 p.s.i.g., respectively, and (3) precipitation of cuprous oxide by addition of a base from the group consisting of sodium hydroxide and potassium hydroxide.

References Cited

UNITED STATES PATENTS

| | | | |
|---|---|---|---|
| 1,686,391 | 10/1928 | Muller et al. | 75—103 |
| 2,104,754 | 1/1938 | Marsh | 423—42 |
| 2,647,829 | 8/1953 | McGaulgy | 423—33 |
| 3,492,115 | 1/1970 | Mahalla | 423—33 |
| 3,640,703 | 2/1972 | Cooper | 75—117 |

EARL C. THOMAS, Primary Examiner

E. T. WHEELOCK, Assistant Examiner

U.S. Cl. X.R.

75—117